Nov. 21, 1939.  T. D. CRANE  2,180,582
MILK BOTTLE STOPPER
Original Filed Sept. 30, 1936   2 Sheets-Sheet 1

Inventor
T. D. Crane
Arthur H. Sturges  Attorney

Nov. 21, 1939. T. D. CRANE 2,180,582
MILK BOTTLE STOPPER
Original Filed Sept. 30, 1936 2 Sheets-Sheet 2

Inventor
T.D.Crane
By Arthur H. Sturges
Attorney

Patented Nov. 21, 1939

2,180,582

UNITED STATES PATENT OFFICE 2,180,582

MILK BOTTLE STOPPER

Theodore D. Crane, Council Bluffs, Iowa

Application September 30, 1936, Serial No. 103,274
Renewed March 31, 1939

5 Claims. (Cl. 215—76)

This invention relates to closures for receptacles and more particularly for liquid containers such as milk bottles or the like.

It is an object of the invention to provide a stopper for a milk bottle of few and simple parts which may be readily attached in a position of use on and removed from the bottle, for sterilizing and cleansing purposes.

A further object of the invention is to provide a closure means or stopper for a bottle having an integral spout for pouring from the bottle the contents thereof, said closure means being adapted to readily open for pouring purposes.

A still further object of the invention is to provide a device for the said purposes having resilient parts susceptible of expansion and contraction for providing a seal against the admission of air to the interior of the vessel or bottle, the said device being particularly adapted to retain substances which generate pressure or expanding gases while sealed within a container, said bottle together with the particular cover of the present invention providing a means for shaking carbonated water and a mixing thereof in refreshing drinks and the like.

Other and further objects and advantages of the invention will be understood from the following detailed description thereof, reference being had to the accompanying drawings wherein.

Figure 1:
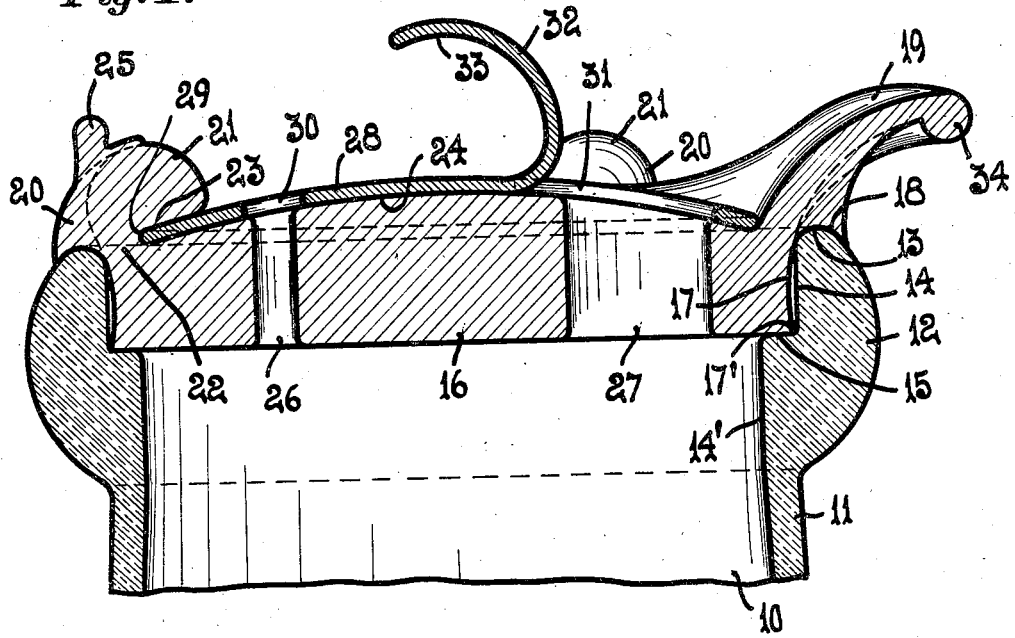
Figure 1 is a transverse sectional view of a fragment of a milk bottle having a preferred embodiment of the invention applied thereto, the view being taken substantially on line 1—1 of Figure 2.

Referring to the drawings for a more particular description and first to Figure 1, 10 indicates a vessel or milk bottle having a neck 11, the open end thereof being provided with an annularly disposed reinforcing collar 12, the latter having a perimeter 13 of arcuate shape in cross section and an annular interior wall 14 which is substantially parallel with and of greater diameter than the interior wall portion 14' providing a step portion 15 disposed at a right angle with respect to said walls, thereby providing a recessed annulus, in the neck 11, said parts and the form thereof being conventional.

The stopper or closure member of the preferred modification shown in Figure 1 includes a washer 16 formed of resilient material such as rubber having an annular wall 17 which is normally of concaved contour in cross section providing an annular portion 17' which in use is adapted to abut the interior wall 14 of the bottle adjacent the junction of the wall 17 with the step 15, said wall 17 being of slightly greater diameter than the wall 14 of the bottle for purposes later described. The end of the wall 17 opposite to the step 15 is provided with an annular recess 18 and flares outwardly and downwardly towards the step 15 and is adapted to snugly engage the arcuate perimeter 13 of the bottle and cooperate therewith for purposes later described.

A spout 19 is preferably formed integral with the washer and in use extends beyond the side wall of the bottle.

A plurality of lugs 20, preferably three thereof being employed, are substantially equi-distantly spaced with respect to each other and are formed integral with the washer 16. Each lug is provided with a head portion 21 which extends towards the center of the washer and overlies the neck 22 of each lug, whereby slots 23 are provided between each head and the upper surface 24 of the washer, the latter said surface being convexed in cross section for purposes later described.

One of the lugs 20 is provided with a tank 25 for facilitating a manual movement of said head for freeing a later described disc at times when the stopper is detached from a bottle.

The washer is provided with an aperture 26 extending through it in parallelism with the axis thereof for air vent purposes, said aperture being oppositely disposed with respect to the pouring spout 19 and also in parallelism with an orifice or aperture 27, the latter being comparatively of greater area than the aperture 26, said spout, aperture and orifice, being in alignment transversely of the washer.

A disc 28 formed of any suitable material is provided having a convexed contour in cross section corresponding to the shape of the surface 24 of the washer 16, said disc being axially disposed in use upon and with respect to the said washer, said disc being normally maintained in said position by means of the heads 21 of the lugs 20, the perimeter 29 of said disc being received within the slots 23, said disc being adapted at times to have revoluble movements in said slots for purposes later described.

The disc 28 is provided with an aperture 30 which is of substantially the same diameter as the aperture 26 of the washer and is adapted to be positioned in alignment at times with said aperture for venting the interior of the bottle. Similarly the disc 28 is provided with an opening 31 therethrough and is adapted to be rotated for aligning the opening 31 and orifice 27 of the washer for permitting pouring of the contents of the bottle through the then aligned orifice 27 and opening 31.

The opening 31 is provided through the disc by means of a punch press operation, preferably, the material being struck outwardly from the disc and bent to provide a handle 32 for facilitating rotating the disc, said handle as best shown in Figure 1 being bent towards the disc appreciably for providing a finger hold 33 for lifting and carrying the bottle.

In operation the stopper or washer 16 is pressed into the neck of the bottle, the comparatively stiff disc 28 facilitating the operation, the bottom surface of the washer adjacent the junction thereof with the wall 17 engaging the inner annular wall of the bottle adjacent the step 15, causing the corner 17' of the washer to be forced into the corner of the step and wall 14 of the bottle or against the said wall, the flared portion 18 of the stopper snugly abutting the arcuate perimeter 13 of the bottle for providing a seal, at more than one place between the bottle and stopper.

When in said position and as thus described it will be understood that the heads 21 of the lugs 20 become tilted towards the central portion of the washer by means of the pressure exerted on the lugs by the engagement of the washer with the perimeter 13 of the bottle, causing said heads to lightly squeeze upon the disc 28 for providing a seal between the disc 28 and the upper surface 24 of the washer while at the same time permitting the disc to be manually rotatable with respect to the washer for causing the apertures of the disc and washer to align for pouring purposes and also permitting the disc to be further rotated for sealing the bottle.

The pouring spout 19 is provided with a lip 34 which during pouring operations functions to retain thereon drops of liquid or material which does not become free from the spout during pouring operations, whereby said liquid may be readily wiped from said lip.

It will be noted that the operator may at times when the stopper is out of the bottle place his thumb against the tang 25 of the lug having said tang for causing the head of the lug to be moved away from the disc 28 for freeing the latter, whereby the disc may be readily separated from the washer for cleansing and sterilizing purposes.

Figure 2:
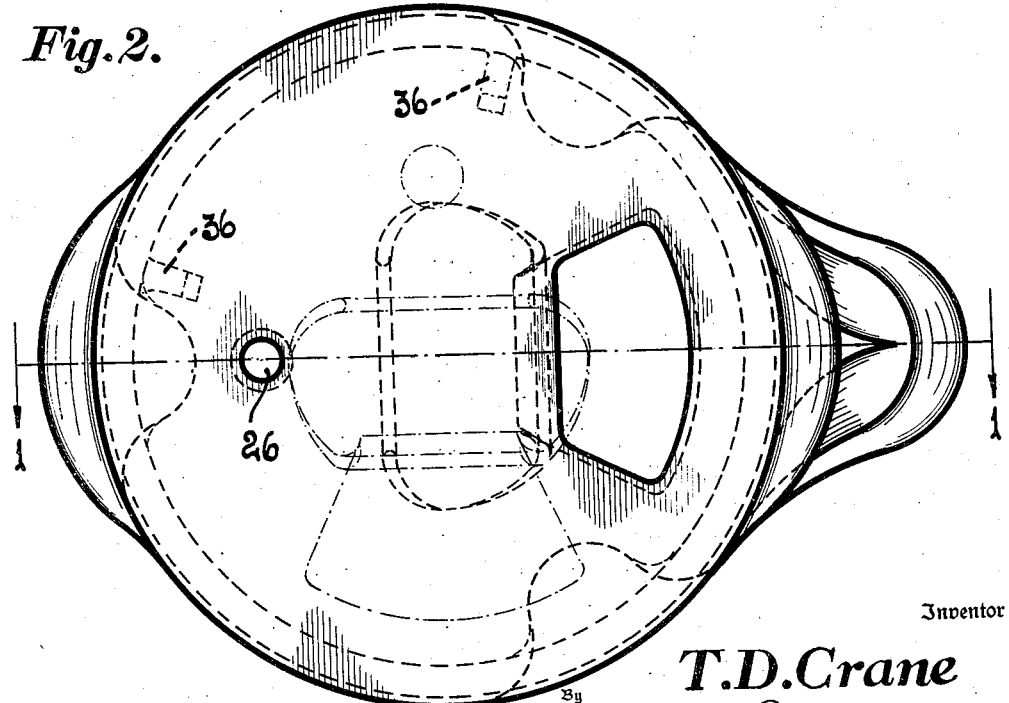
Figure 2 is a bottom plan view of the closure member for the bottle shown in Figure 1.

The disc is provided with a stop 36 which is adapted to abut against the sides of the lugs 20 as illustrated in Figure 2 for limiting the movement of the disc with respect to the washer for facilitating the aligning of the orifice 27 and opening 31 and providing an air vent.

Figure 3:
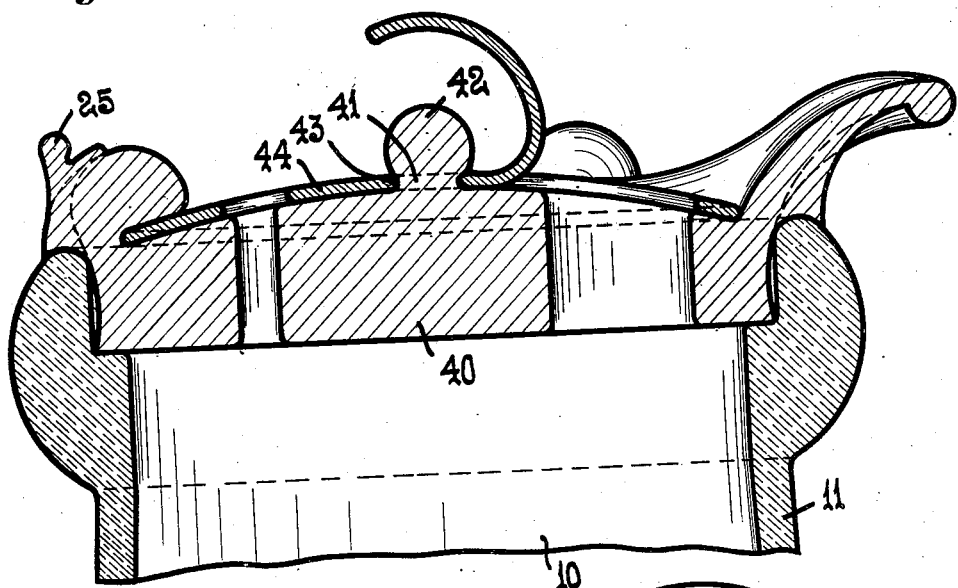
Figure 3 is a view similar to Figure 1 and showing a modification of the preferred construction, the view being taken substantially on line 3—3 of Figure 4.
Figures 4, 5:
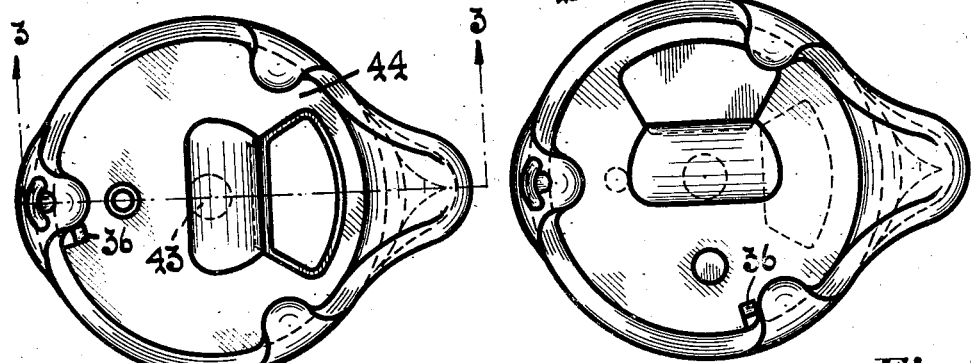
Figure 4 is a top plan view of the closure device shown in Figure 3, the parts of said device being in a relative position for permitting the contents of the bottle to be poured therethrough.
Figure 5 is a view similar to Figure 4, but showing the parts thereof in a closed or sealed position.

Referring to the modification shown in Figures 4 and 5 the latter is similar to the preferred modification shown in Figure 1 and functions similarly for the same purposes, except that the washer 40 of said modification is formed with a preferably integral shaft 41 having an expanded head 42, said shaft extending through an aperture 43 provided axially through a disc 44 for assuring that the disc 44 will firmly abut the washer 40 at all times, said construction being particularly useful in instances where expanding gases or substances are contained in the bottle for further sealing the disc with respect to the washer particularly adjacent the axis of said disc and washer.

Figure 6:
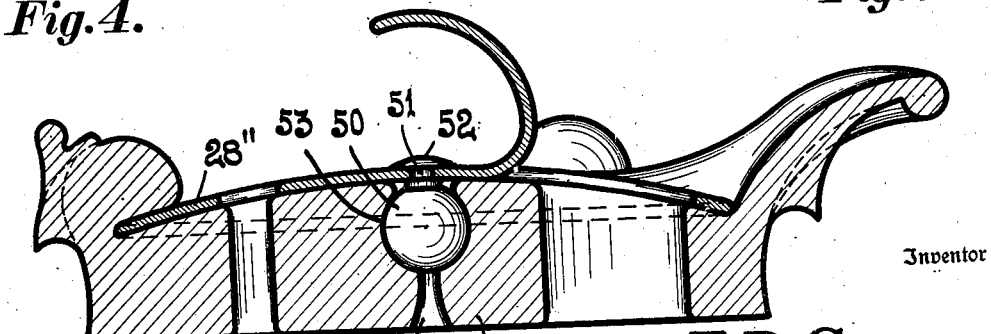
Figure 6 is a transverse sectional view of a further modification of the preferred construction.

The further modification shown in Figure 6 includes a ball 50 formed of any suitable material and having a shaft 51 secured to the disc 28'' by any suitable means such as peening the shaft as indicated at 52 or the like. The washer of this modification is provided with a recess 53 formed therein for receiving the ball 50, said ball being of slightly greater diameter than the diameter of the recess 53 whereby at times when the stopper is pressed into a bottle the washer portions adjacent to the ball are squeezed against the latter for effecting a seal between the disc of the device and adjacent its medial portion and between it and the washer, said seal being particularly useful at times when carbonated waters or the like are to be agitated within the bottle. The recess 50 is provided with a bore 54 extending through the washer which facilitates cleaning the parts at times when the washer and disc are taken apart for said purpose. The modifications of the preferred constructions are each also provided with a stop 36.

It is obvious that various changes and modifications may be made in the details of construction and design of the above specifically described embodiment of this invention without departing from the spirit thereof, such changes and modifications being restricted only by the scope of the invention as hereinafter claimed.

What is claimed is:

1. A stopper for a container having a recessed annulus in the neck thereof comprising a resilient washer provided with a plurality of spaced apart apertures and having a convex outer surface, said washer adapted to be squeezed into cooperative relation with said annulus for sealing said container, revoluble sealing means for said apertures of the washer engaging the convex surface of the washer, comprising a disc axially disposed with respect to and removably secured to said washer, said disc having a plurality of apertures spaced apart coincidingly with respect to the apertures of the washer, said disc adapted to be manually rotated for causing the apertures thereof to align with the apertures of the washer for permitting pouring of contents of the container through the stopper, and inwardly projecting means carried by said washer frictionally engaging the marginal portions of said disc.

2. A device for sealing a container having an annular wall in the neck thereof comprising a resilient washer having a perimeter adapted to be snugly engaged with the said wall for closing said neck and provided with a convex outer surface, said washer having an outlet orifice and an air vent aperture, said washer provided with a plurality of spaced apart integral lugs disposed adjacent the perimeter thereof, said lugs having heads overlying the washer toward the medial portions thereof and providing slots disposed between said heads and said washer, and sealing means for said orifice and air vent snugly engaging the convex surface of said washer comprising a disc circular in plan provided with apertures adapted to align respectively with said orifice and vent during rotary movement of the disc for permitting pouring of the contents of the container therefrom, said disc having a perimeter adapted to engage in said slots for normally maintaining the disc axially of the washer and in abutting relation with respect to the latter.

3. A stopper for a container having an annular wall in the neck thereof comprising a resilient washer of greater normal diameter than said wall and having a convex outer surface, said washer adapted to be squeezed into said neck for sealing said container adjacent said wall, said washer provided with a pouring aperture and an air vent aperture, a plurality of inwardly projecting lugs on said washer, sealing means for said aperture engaging beneath said lugs comprising a disc snugly engaging the convex surface of said washer, said disc having a plurality of apertures spaced apart coincidingly with respect to the apertures of the washer, said disc adapted to be manually rotated for causing the apertures thereof to align with the apertures of the washer for permitting pouring of contents of the container through the stopper, and a stop-detent carried by said disc arranged to cooperate with the lugs of the washer for limiting rotary movements of the disc with respect to said washer for insuring accurate alignment of said apertures in both an open and closed position thereof.

4. A stopper for a container having an annular wall in the neck thereof comprising a resilient washer provided with a plurality of spaced apart apertures and a convex outer surface, said washer adapted to be squeezed into cooperative relation with said wall for sealing said container, revoluble sealing means for said apertures of the washer comprising a disc axially disposed with respect to and removably secured to said stopper and snugly engaging the convex surface of said washer, said disc having a plurality of apertures spaced apart coincidingly with respect to the apertures of the washer, said disc adapted to be manually rotated for causing the apertures thereof to align with the apertures of the washer for permitting pouring of contents of the container through said washer and sealing means, inwardly projecting means carried by said washer to frictionally hold said disc on said washer, and a spout carried by said washer for guiding said contents outwardly of the container.

5. A combined stopper and pouring means for a milk bottle comprising an annular member snugly engageable in the stopper seat of the bottle and provided with a pouring opening and an air vent, the outer face of said member being convex, a spout integral with and extending laterally of said member, a closure plate snugly engaging the convex face of said member, upstanding lugs integral with said member overlying the marginal portions of said plate and tensioning said plate against the convex surface of said member, said plate having apertures for registry with said pouring opening and vent of said member, and an upstanding handle carried by said plate.

THEODORE D. CRANE.